United States Patent
Faber et al.

(10) Patent No.: US 8,027,898 B2
(45) Date of Patent: *Sep. 27, 2011

(54) METHOD AND APPARATUS FOR PRIORITIZING A LISTING OF INFORMATION PROVIDERS

(75) Inventors: Scott Faber, San Francisco, CA (US); Ron Hirson, San Francisco, CA (US); Henrik Axel Ebbe Altberg, Mill Valley, CA (US); Sean David Van Der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/534,770

(22) Filed: Aug. 3, 2009

(65) Prior Publication Data

US 2010/0017266 A1  Jan. 21, 2010

Related U.S. Application Data

(63) Continuation of application No. 10/465,770, filed on Jun. 18, 2003, now Pat. No. 7,698,183.

(51) Int. Cl.
G06Q 40/00 (2006.01)

(52) U.S. Cl. ............................................. 705/35; 705/36

(58) Field of Classification Search ........... 705/35–36 R
See application file for complete search history.

(56) References Cited

U.S. PATENT DOCUMENTS

| | | | |
|---|---|---|---|
| 4,741,025 A | 4/1988 | Maruyama et al. | |
| 4,796,293 A | 1/1989 | Blinken et al. | |
| 5,099,510 A | 3/1992 | Blinken, Jr. et al. | |
| 5,361,295 A | 11/1994 | Solomon et al. | |
| 5,373,549 A | 12/1994 | Bales et al. | |
| 5,436,957 A | 7/1995 | McConnell | |
| 5,483,352 A | 1/1996 | Fukuyama et al. | |
| 5,483,588 A | 1/1996 | Eaton et al. | |
| 5,539,813 A | 7/1996 | Jonsson | |
| 5,544,237 A | 8/1996 | Bales et al. | |
| 5,555,298 A | 9/1996 | Jonsson | |
| 5,559,875 A | 9/1996 | Bieselin et al. | |

(Continued)

FOREIGN PATENT DOCUMENTS

EP  1489529  12/2004

(Continued)

OTHER PUBLICATIONS

"Applying Technology News," Accounting Technology, p. 14, Feb./Mar. 1997.

(Continued)

*Primary Examiner* — Thu Thao Havan
(74) *Attorney, Agent, or Firm* — Greenberg Traurig, LLP

(57) ABSTRACT

A method and apparatus for prioritizing a listing of information providers according to a fee value and availability status indicated for the information providers, and providing a set of one or more information provider identifiers that satisfy a request for a type of information provider that has been received from a user over the Internet. The set of information provider identifiers are ranked according to their associated fee values and availability status. A set of one or more files are generated to display the set of information provider identifiers. The set of files are transmitted to the user, and the user is provided access to an information provider identified by one of the set of information provider identifiers.

17 Claims, 13 Drawing Sheets

U.S. PATENT DOCUMENTS

| | | | |
|---|---|---|---|
| 5,608,786 | A | 3/1997 | Gordon |
| 5,619,555 | A | 4/1997 | Fenton et al. |
| 5,644,715 | A | 7/1997 | Baugher |
| 5,689,553 | A | 11/1997 | Ahuja et al. |
| 5,740,549 | A | 4/1998 | Reilly et al. |
| 5,841,763 | A | 11/1998 | Leondires et al. |
| 5,862,223 | A | 1/1999 | Walker et al. |
| 5,991,394 | A | 11/1999 | Dezonno et al. |
| 6,131,085 | A | 10/2000 | Rossides |
| 6,223,165 | B1 * | 4/2001 | Lauffer ............................. 705/8 |
| 6,233,566 | B1 * | 5/2001 | Levine et al. ............... 705/36 R |
| 6,301,350 | B1 | 10/2001 | Henningson et al. |
| 6,529,946 | B2 | 3/2003 | Yokono et al. |
| 6,535,506 | B1 | 3/2003 | Narain et al. |
| 7,363,254 | B2 | 4/2008 | Skinner |
| 7,380,139 | B2 | 5/2008 | Tagawa et al. |
| 2002/0077891 | A1 | 6/2002 | Castle et al. |
| 2003/0046161 | A1 | 3/2003 | Kamanger et al. |
| 2003/0135460 | A1 | 7/2003 | Talegon |
| 2003/0220837 | A1 | 11/2003 | Asayama |
| 2004/0044571 | A1 | 3/2004 | Bronnimann et al. |
| 2004/0225562 | A1 | 11/2004 | Turner |
| 2005/0033641 | A1 | 2/2005 | Jha et al. |
| 2005/0119957 | A1 | 6/2005 | Faber et al. |
| 2005/0203796 | A1 | 9/2005 | Anand et al. |
| 2006/0031516 | A1 | 2/2006 | Kumer |
| 2006/0075104 | A1 | 4/2006 | Kumer |
| 2006/0149624 | A1 | 7/2006 | Baluja et al. |
| 2006/0200380 | A1 | 9/2006 | Ho et al. |
| 2007/0078717 | A1 | 4/2007 | Ho et al. |
| 2007/0174124 | A1 | 7/2007 | Zagofsky et al. |

FOREIGN PATENT DOCUMENTS

| | | |
|---|---|---|
| GB | 2329046 | 3/1999 |
| WO | 0244870 | 6/2002 |
| WO | 2006091966 | 8/2006 |

OTHER PUBLICATIONS

"TriNet's 'Help Me, I'm Stuck' Internet Voice Button Services Pushes Web Pages to Online Users," Business Wire, Mar. 25, 1998.

Allexperts.com, company information retrieved from http://www.allexperts.com, available at least by Apr. 9, 2000.

Answers.com, company information retrieved from http://www.answers.com, available at least by Aug. 8, 2000.

Dalton, Gregory, "Rent-An-Expert on the Web," Information Week, p. 75, Sep. 6, 1999.

Exp.com, Inc., company information retrieved from http://www.exp.com, available at least by Sep. 20, 2000.

Expertcity.com, "About Us," company information retrieved from http://www.expertcity.com, available at least by Apr. 9, 2000.

Experts Exchange, Inc., company information retrieved from http://www.experts-exchange.com, available at least by Apr. 9, 2000.

University of Texas—Austin, information on the Electronic Emissary Project retrieved at www.tapr.org/emissary, available at least by Apr. 9, 2000.

Wasik, Joann M., "Information for Sale: Commercial Digital Reference and AskA Services," Virtual Reference Desk, http://www.vrd.org/AskA/commAskA.html, Sep. 20, 1999.

Wieland, Heidi et al., "Expertcity.com Launches Premier Online Marketplace for Expert Services," PR Newswire, Aug. 30, 1999.

Sterling, Greg, "Ingenio's Ether—Pay Per Professional Advice," Search Engine Journal, Mar. 3, 2006.

International Application No. PCT/US07/82439, Written Opinion and International Search Report, Feb. 21, 2008.

International Application No. PCT/US06/07023, Written Opinion and International Search Report, Aug. 7, 2007.

USPTO Transaction History of related U.S. Appl. No. 10/465,770, filed Jun. 18, 2003, entitled "Method and Apparatus for Prioritizing a Listing of Information Providers."

USPTO Transaction History of related U.S. Appl. No. 11/072,147, filed Mar. 3, 2005, entitled "Method and Apparatus for Sorting Lists for Presentation."

USPTO Transaction History of related U.S. Appl. No. 11/559,860, filed Nov. 14, 2006, entitled "Method and Apparatus for Prioritizing Advertisements for Presentation."

USPTO Transaction History of related U.S. Appl. No. 11/688,245, filed Mar. 19, 2007, entitled "Method and Apparatus for Prioritizing Featured Listings."

* cited by examiner taxes — Information Provider Search Term 911

Advice: Live | Recorded    Sort by: [Top Available ▽]

Retrieved List of Information Providers 901

Next >

| | | | Information Provider's Fee 913 | Call Link 909 |
|---|---|---|---|---|
| Name/Title | Rating | Rate* | Availability | |
| INFORMATION PROVIDER A<br>Income Tax & TurboTax® Advice ✓ (10535)<br>Details | ***** | $1.99 | | Call Now |
| INFORMATION PROVIDER B<br>Income Tax & TurboTax®<br>Advice  Details | ***** ✓ (7120) | $1.99 | | Call Now |
| INFORMATION PROVIDER C<br>TurboTax® Specialist,<br>Investments, 1099-B, Options<br>Details | ***** ✓ (4048) | $1.85 | | Call Now |
| INFORMATION PROVIDER D<br>Tax Help in Plain English<br>Details | ***** ✓ (3775) | $1.99 | | Call Now |
| INFORMATION PROVIDER E<br>Frienliest Tax Advice on Web,<br>TurboTax® Magician  Details | ***** ✓ (3454) | $1.85 | | Call Now |

Information Provider's ID's 903

Rating 907

Verification 905

| | | |
|---|---|---|
| Keen: Featured Listings - Choose A Listing - Microsoft Internet Explorer | | |
| File Edit View Favorites Tools Help | | |
| Back ▼ ⊗ ▼ ⊠ ⚡ 🏠 ❘ 🔍 Search ☆ Favorites ♫ Media 🖉 ▼ ⇕ ▼ W ▼ 🗋 ▼ 👥 | | |
| Address 🗋 http://www.keen.com/f1/chooselisting.asp?sid=245 | | ▷ |

Links  Customize Links  Free Hotmail  Windows Media  Windows Biz

Keen Your Personal Advisor

Home > My Keen > Featured Listings Results

Featured Listings Results. Overview

Overview | Bids | Clicks | Calls

For Listing: [ All Listings ▽ ]
Time Period: [ Month To Date ▽ ] [ View Overview ]

Overview for All Listings for Month To Date

| | | |
|---|---|---|
| Total Clicks | 0 | Total count of all clicks on your Featured Listings. |
| Charged Clicks | 0 | Count of qualified clicks from Seekers that result in a charge. See Tips & Strategies for more details. |
| Calls From Featured Listings | 0 | Calls directly resulting from qualified clicks. |
| Cost Per Charged Click | $0.00 | Based on 'Auto-Pricing,' the average count per qualified click to feature the listing. |
| Total Cost | $0.00 | Total cost of featuring the listing. |
| Earnings from Featured Listings | $0.00 | Money earned from calls from qualified clicks. |
| Total Earnings | $0.00 | Total money earned from calls from qualified clicks and money from customers acquired from featuring your listing. |
| Earnings Per Charged Click | $0.00 | The money you earned, on average, per qualified click from featured listings. |

Featured Listings Help

©1999-2003 Keen Inc., All Rights Reserved.  Trademark Notice

METHOD AND APPARATUS FOR PRIORITIZING A LISTING OF INFORMATION PROVIDERS

RELATED APPLICATIONS

The present application is a continuation application of U.S. patent application Ser. No. 10/465,770 filed Jun. 18, 2003, the disclosure of which is hereby incorporated herein by reference.

FIELD OF THE TECHNOLOGY

The invention relates to the field of accessing information online. More specifically, the invention relates to providing access to information providers online.

BACKGROUND

Information providers, such as therapists, computer technicians, tax advisors, etc., have increasingly been delivering their services through the Internet and telephone. Information providers can advertise their services online for viewing by Internet users. In addition, users can search for information providers with conventional search engines.

Once the user finds a desired information provider and selects the information provider, the user can contact that person for services delivered immediately through the Internet or telephone. For example, a customer selects a therapist from a list of therapists displayed online. The selected therapist is offering an instant consultation fee of $1 per minute or $50 for a full one-hour session. The therapist's advertisement displays an indicator of real-time availability—such as a green light—that indicates that this therapist is ready to perform the consultation at the present time. The customer can contact the therapist by clicking an on-screen button that initiates a telephone call or video chat session. The customer can then receive the consultation and pay the therapist automatically online.

In such an online system, the information provider signals to the customer when the information provider is ready to deliver services. Otherwise, a customer may initiate contact while the therapist is not available. The information provider manages the online indicator of his/her availability, informing the system when he/she is ready to communicate with customers. For example, when the therapist is out to lunch, he/she uses the online system to change the availability indicator from green to red, informing everyone that this information provider is no longer available at the present time.

Search engines typically provide advertisers with the ability to place advertisements according to specific keywords. A seller of antique vases, for instance, will pay the search engine to display his/her advertisement when a customer searches on the keyword "vases." In order to sell keyword advertising most efficiently, search engines will typically use a bidding system, in which advertisers bid in order to have their advertisements appear more prominently, or higher in an ordered list, than competing advertisers. Other bidding systems take into account the popularity of certain advertisers among customers, and factor in this popularity as well as bid amounts into the ranking of advertisers.

These bidding systems, however, fail when it comes to displaying information providers rather than advertisements for objects or web sites. This is because information providers are human and are not always available to provide services—they may be busy with another customer or out to lunch. If a search engine were to use a typical bidding system in order to display information providers, the top bidders, and therefore the top service advertisements, are likely to be unavailable information providers. This would be a dead-end result for the customer.

Therefore, a need exists for a combination of a bidding mechanism and an additional criterion to determine the order that information provider advertisements are to be displayed.

SUMMARY OF THE DESCRIPTION

A method and apparatus for prioritizing a listing of information providers is described. According to one aspect of the invention, the listing of information providers is prioritized according to a fee value and availability status indicated for each information provider. The method additionally provides for retrieving a set of one or more information provider identifiers that satisfy a request for a type of information provider that has been received from a user over the Internet. The set of information provider identifiers are ranked according to their associated fee values and availability status. A set of one or more files are generated to display the set of information provider identifiers. The set of files are transmitted to the user, and the user is provided access to an information provider identified by one of the set of information provider identifiers.

These and other aspects of the present invention will be better described with reference to the Detailed Description and the accompanying figures.

BRIEF DESCRIPTION OF THE DRAWINGS

The invention may best be understood by referring to the following description and accompanying drawings that are used to illustrate embodiments of the invention. In the drawings:

FIG. 9 is a screen shot of an exemplary web page displaying a prioritized list of information provider identifiers according to one embodiment of the invention;

FIG. 11 is an exemplary report interface according to one embodiment of the invention.

DETAILED DESCRIPTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Overview

Methods and apparatuses provide for prioritizing information providers accessible via the Internet. In response to receiving a search term(s) for an information provider, an information provider search engine provides access to an information provider relevant to the search term(s) via the Internet. The information provider search engine prioritizes the information providers and displays the information providers relevant to the search term(s) according to the prioritization.

The information providers are prioritized according to multiple prioritizing variables. A first of the prioritizing variables indicates a fee that an information provider pays to the information provider search engine. A second of the prioritizing variables indicates availability of an information provider. Additional prioritizing variables can be combined with the fee variable and the availability variable for prioritizing the information providers.

Prioritizing Information Provider Listings

Figure 1:
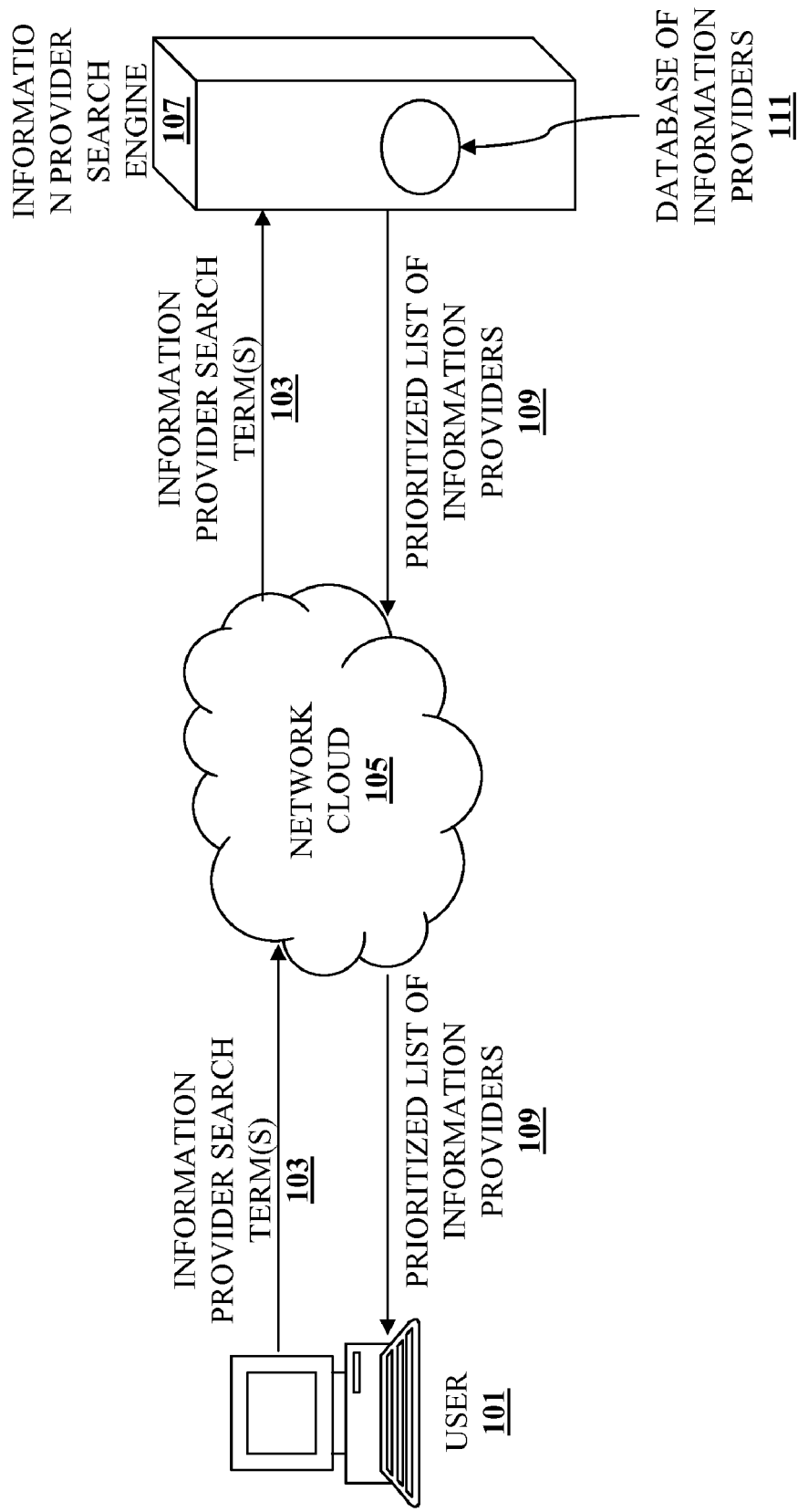
FIG. 1 is an exemplary diagram of a network including an information provider search engine according to one embodiment of the invention.

FIG. 1 is an exemplary diagram of a network including an information provider search engine according to one embodiment of the invention. In FIG. 1, a user 101 transmits an information provider search term(s) 103 through a network cloud 105 to an information provider search engine 107. Various techniques can be utilized for communicating an information provider search term(s) to the information provider search engine. For example, the information provider search term(s) is entered by a user. In another example, the information provider search term(s) is a link selected by the user.

The information provider search engine 107 includes a database of information providers 111. The information provider search engine 107 retrieves information provider information from the database of information providers 111 relevant to the received information provider search term(s) 103. The information provider search engine 107 prioritizes the retrieved information providers into a list as will be described in more detail later. Although the retrieved information providers are described as being prioritized into a list, the term list is only used to aid in understanding the described invention and is not meant to be limiting upon the described invention. The retrieved information provider information may be organized into tables, trees, etc. The prioritized list of information providers 109 is sent from the information provider search engine 107 to the user 101.

The servers described above include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Figure 2:
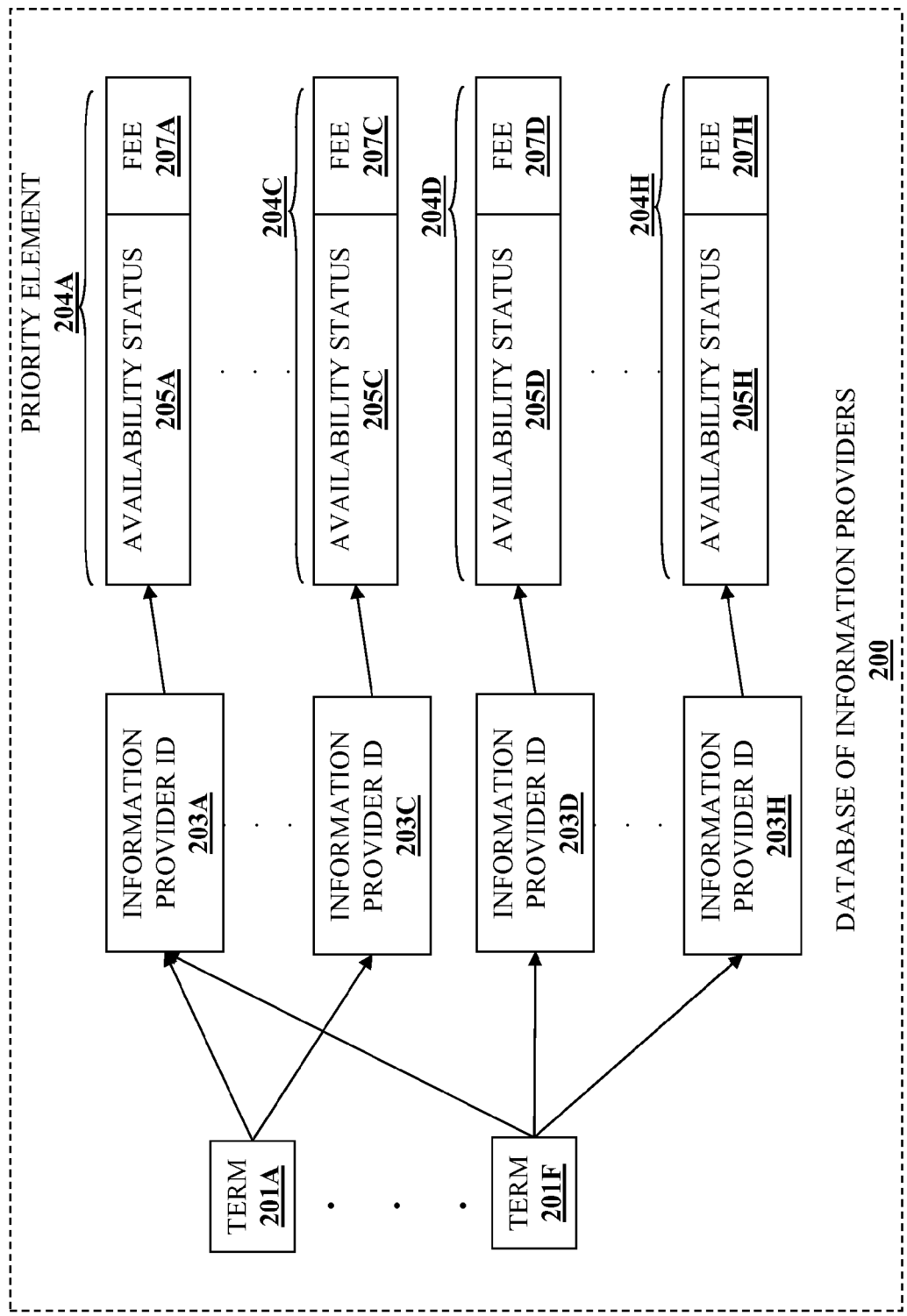
FIG. 2 is a conceptual diagram of an exemplary database of information providers according to one embodiment of the invention.

FIG. 2 is a conceptual diagram of an exemplary database of information providers according to one embodiment of the invention. A database of information providers 200 includes term elements 201A-201F. The term element 201A is linked to information provider identifier elements 203A-203C. In an alternative embodiment of the invention, categories index an information provider database in addition to or instead of terms. The term element 201A is linked to consecutive information provider identifier elements in this illustration, but it is not necessary to the described invention. The term element 201A could be linked to information provider identifier elements 203A and 203C, but not the information provider identifier element 203B in a different illustration. The term 201F is linked to the information provider identifier element 203A and information provider identifier elements 203D-203H. An information provider identifier can be a variety of values including an alphanumeric identifier, a memory address, etc. While in one embodiment of the invention the information provider identifier is a uniform resource locator, in alternative embodiments of the invention the information provider database includes uniform resource locators associated with each of the information provider identifiers.

The information provider identifier elements 203A, 203C, 203D, and 203H are respectively linked to priority elements 204A, 204C, 204D, and 204H. The priority elements 204A, 204C, 204D, and 204H respectively include availability status fields 205A, 205C, 205D, and 205H. The priority elements 204A, 204C, 204D, and 204H also respectively include fee fields 207A, 207C, 207D, and 207H.

The availability status field indicates availability of a corresponding information provider (e.g., available, busy, arrange for later call, not taking calls, etc.). The fee field indicates a fee to be paid by the identified information provider to the information provider search engine. The fee may be a flat fee, an action based fee, a percentage of the information provider's fee, a fee grade, etc. In one embodiment of the invention, a fee grade level is a value indicating a level of fee. The fee varies based on a number of factors (e.g., the type of information provider, the user's action, etc.). An action based fee is a fee that varies in relation to whether the user is connected to the information provider, the information provider is selected but not connected, the information provider is viewed but not selected, etc.

In one embodiment of the invention, the information provider is charged a click fee only if the end user has a credit card in the system. Hence, the system may be more efficient if the information provider can bid for a more tangible event, such as the click of a real customer as opposed to the click of a fickle browser. In another embodiment of the invention, the information provider is not charged when a customer without a credit card in the system clicks on the information provider's listing, but is later charged when the customer add his/her credit card into the system, for example, adding their credit card in the system within a predetermined number days.

In one embodiment, the information provider is not charged a click fee if the customer had previously called them within a predetermined number of days. This ensures that an information provider can bid a high click price and will not be bogged down by their existing customers selecting them. In one embodiment, there is a limit to the number of paid clicks that one end user can impart in a single day, or over a predetermined period of time. As a result, there is a control that prevents a single end user from clicking repeatedly on hundreds of consultants, thus sabotaging the system and deflating the ROI of consultants. Furthermore, an embodiment may include a limit on the number of paid clicks that one end user can impart upon a single information provider in a single day, or predetermined period of time. This feature prevents an end user from sabotaging a single information provider in particular.

Although FIG. 2 illustrates the information provider database as a tree structure, various embodiments of the invention implement the information provider database differently (e.g., a hash table, multi-dimensional array, a hash table referencing a tree, etc.).

When an information provider search engine, such as the information provider search engine 107 of FIG. 1, receives a search term, the information provider search engine searches the database of information providers for the received search term. Upon locating the received search term in the database of information providers, the information provider search engine retrieves those information provider identifiers and priority elements associated with the located search term. The priority elements are used to prioritize the retrieved information provider identifiers. Various embodiments of the invention prioritize the retrieved information providers differently. In one embodiment of the invention, the retrieved information providers are first prioritized, or ranked, according to the value indicated in the fee field and then according to the availability status. In another embodiment of the invention, the retrieved information providers are first prioritized by the value indicated in the availability status field and then the value indicated in the fee field. Alternative embodiments of the invention include additional fields in the priority element. For example, in addition to availability and fee, retrieved information providers are ranked according to a rating (user rating, auditor rating, combination of auditor rating and user rating, etc.), relevancy to the search term(s), name, years of experience, number of referrals, number of user responses, etc.

In addition, in an alternative embodiment, an information provider is further required to have a certain level of feedback to be retrieved and displayed. For example, an information provider may be required to have received feedback from a predetermined number of previous customers and/or have an average review that equal or exceeds a predetermined rating (e.g., at least a 4 out of 5 star rating).

In yet another alternative embodiment, an information provider is required to have a web page (or comparable resource link) of a predetermined level of quality to be retrieved and displayed. For example, information providers may be required to have a web page or resource link that includes a photo or a summary of their qualifications.

Figure 3:
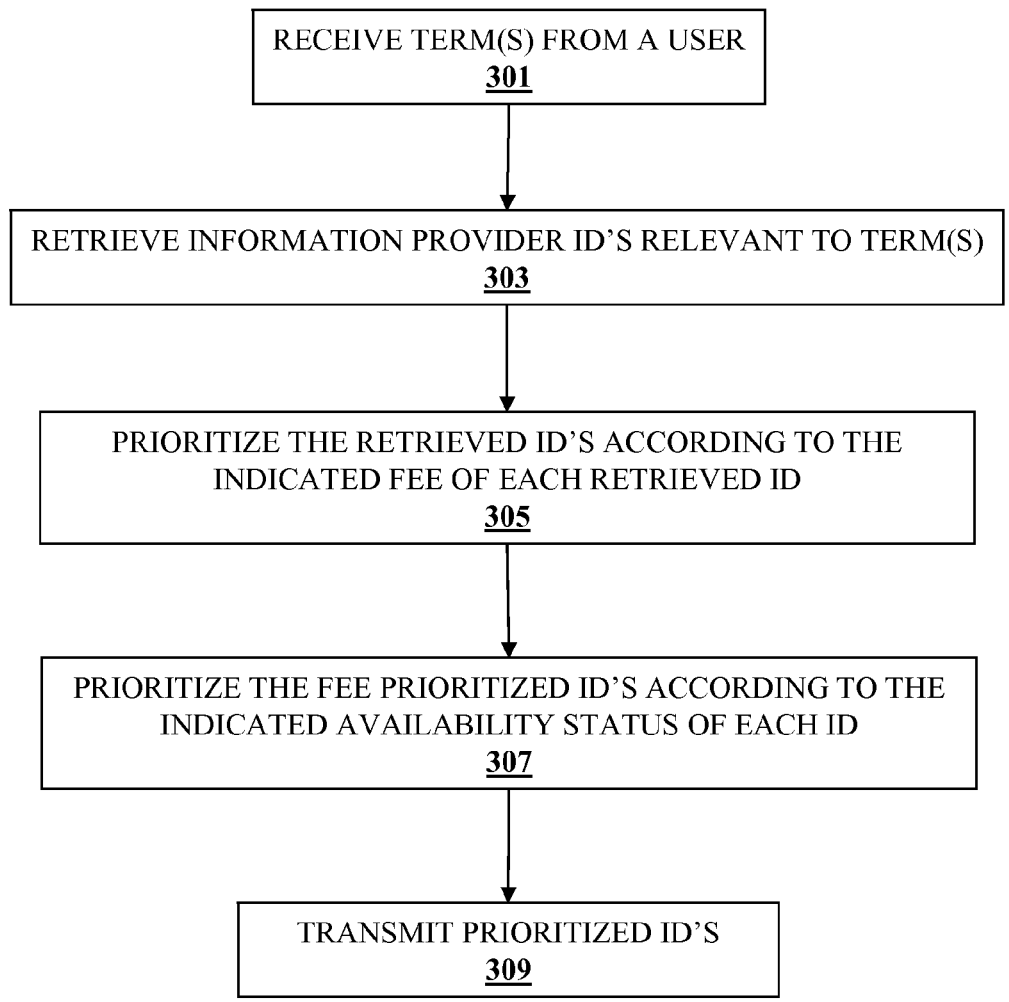
FIG. 3 is a flowchart for providing a prioritized list of information providers according to one embodiment of the invention.

FIG. 3 is a flowchart for providing a prioritized list of information providers according to one embodiment of the invention. At block 301, a search term(s) is received from a user. At block 303, information provider identifiers relevant to the received search term(s) are retrieved. At block 305, the retrieved information provider identifiers are prioritized according to the indicated fee value of each retrieved information provider identifier. At block 307, the fee prioritized information provider identifiers are prioritized according to the indicated availability status of each information provider identifier. At block 309, the prioritized information provider identifiers are transmitted to the user.

Figure 4:
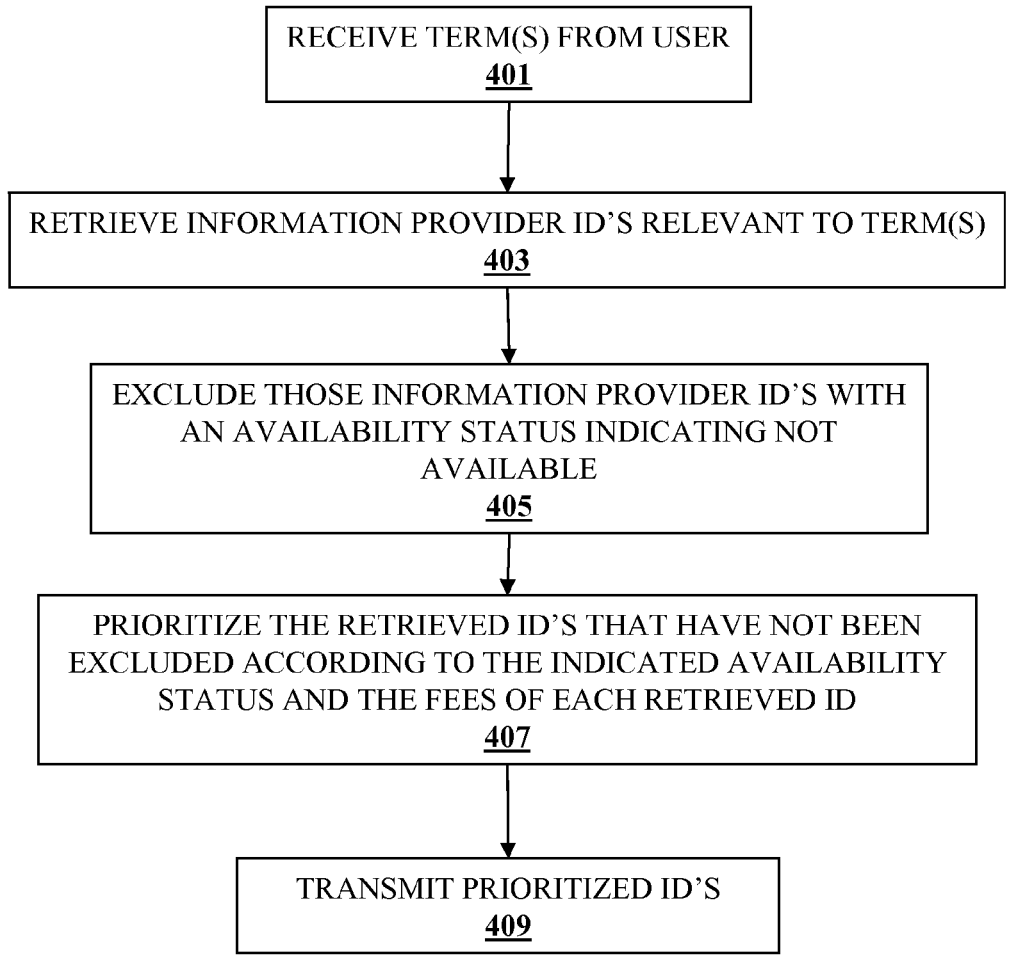
FIG. 4 is a flowchart for providing a prioritized list of available information providers according to one embodiment of the invention.

FIG. 4 is a flowchart for providing a prioritized list of available information providers according to one embodiment of the invention. At block 401, a search term(s) is received from a user. At block 403, information provider identifier relevant to the received search term(s) are retrieved. At block 405, those retrieved information provider identifiers with an availability status of not available are excluded. At block 407, the retrieved information provider identifiers that have not been excluded are prioritized according to the indicated availability status and the indicated fee of each of the remaining retrieved information provider identifiers. At block 409, the prioritized information provider identifiers are transmitted to the user. In an alternative embodiment of the invention, the prioritized information provider identifiers are transmitted to an intermediary device or module that prepares the prioritized information provider identifiers for display to the user.

Figure 5:
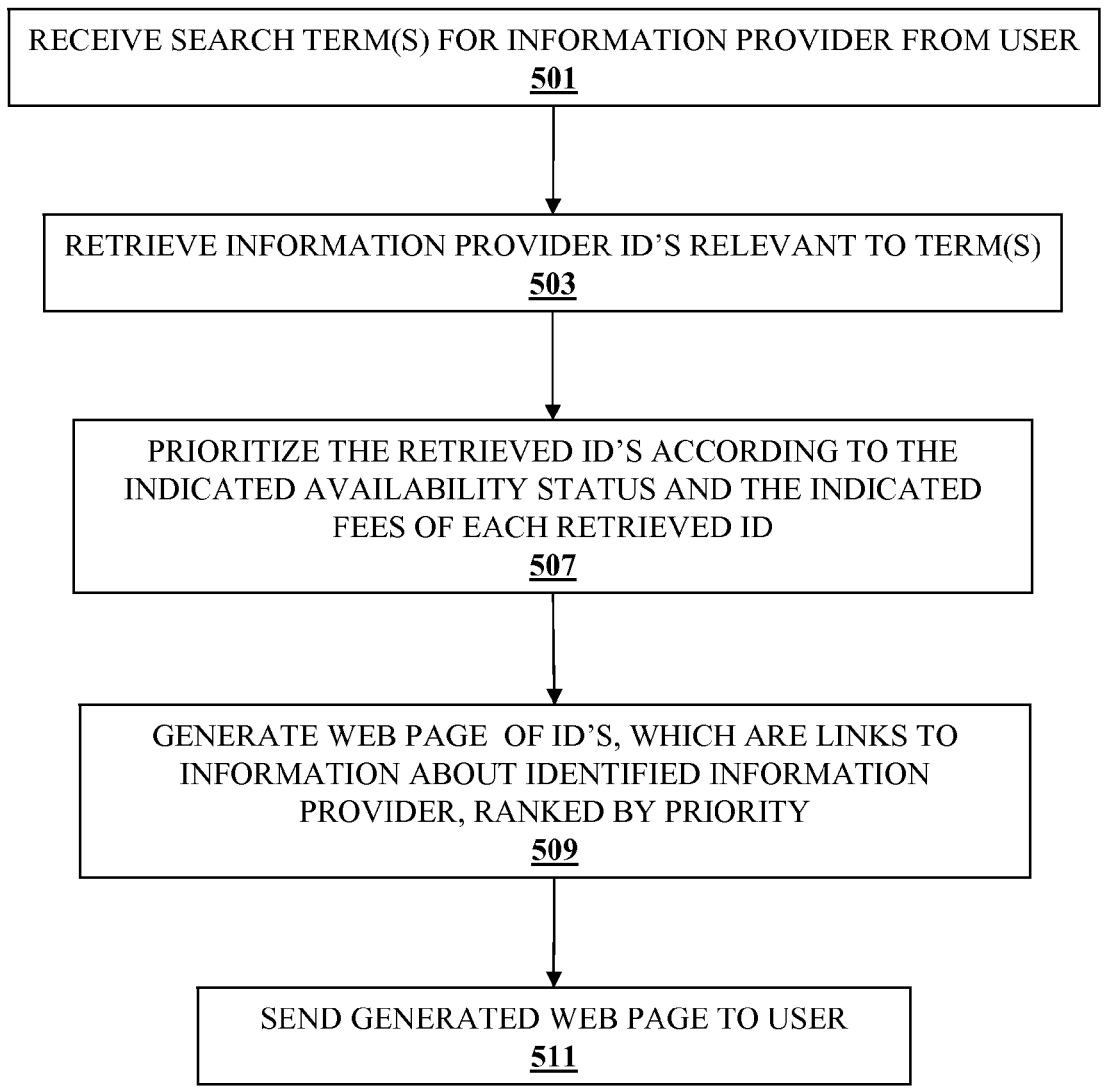
FIG. 5 is a flowchart for generating a web page with prioritized information providers according to one embodiment of the invention.

FIG. 5 is a flowchart for generating a web page with prioritized information providers according to one embodiment of the invention. At block 501, a search term(s) for an information provider is received from a user. At block 503, the information provider identifiers that are relevant to the received search term(s) are retrieved. At block 507, the retrieved information provider identifiers are prioritized according to the indicated availability status and the indicated fee for each of the retrieved information provider identifiers. At block 509, a web page of information provider identifiers, which are links to information about the identified information providers, ranked by priority is generated. At block 511, the generated web page is sent to the user.

Figure 6:
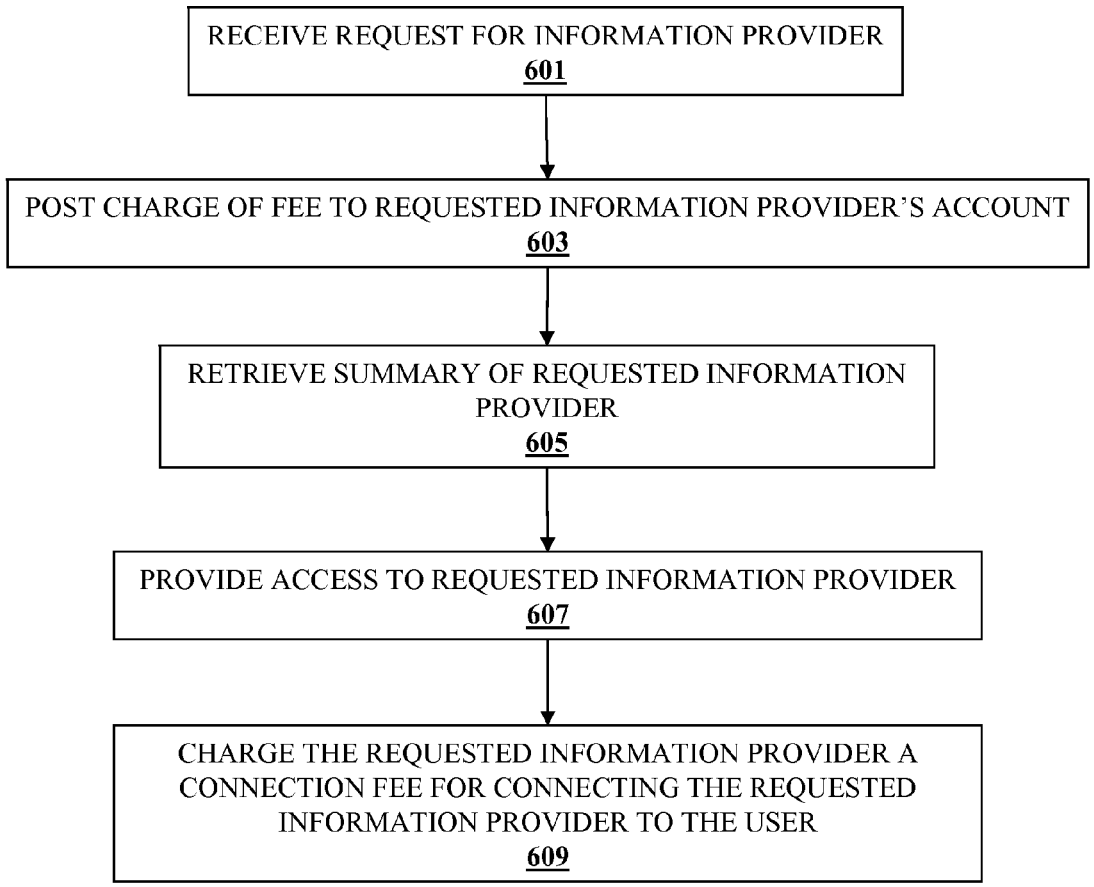
FIG. 6 is a flowchart for charging an information provider a fee according to one embodiment of the invention.

FIG. 6 is a flowchart for charging an information provider a fee according to one embodiment of the invention. At block 601, a request for an information provider is received. At block 603, a charge fee is posted to the requested information provider's account. For FIG. 6, it is assumed that each information provider has an account with the information provider search engine. Information providers are assessed a fee by the information provider search engine, which is posted to the information provider's account. The information provider search engine may collect the fee charged by the information provider from the user and credit the information provider's account, or a third party may be responsible for collections. In an alternative embodiment of the invention, the information provider search engine does not manage accounts for information providers, but has access to at least one of their financial accounts (credit card, checking account, etc.). At block 605, a summary describing the requested information provider is requested. At block 607, access to the requested information provider is provided to the user. At block 609, the requested information provider is charged a connection fee for being connected to the user by the information provider search engine.

Figure 7:
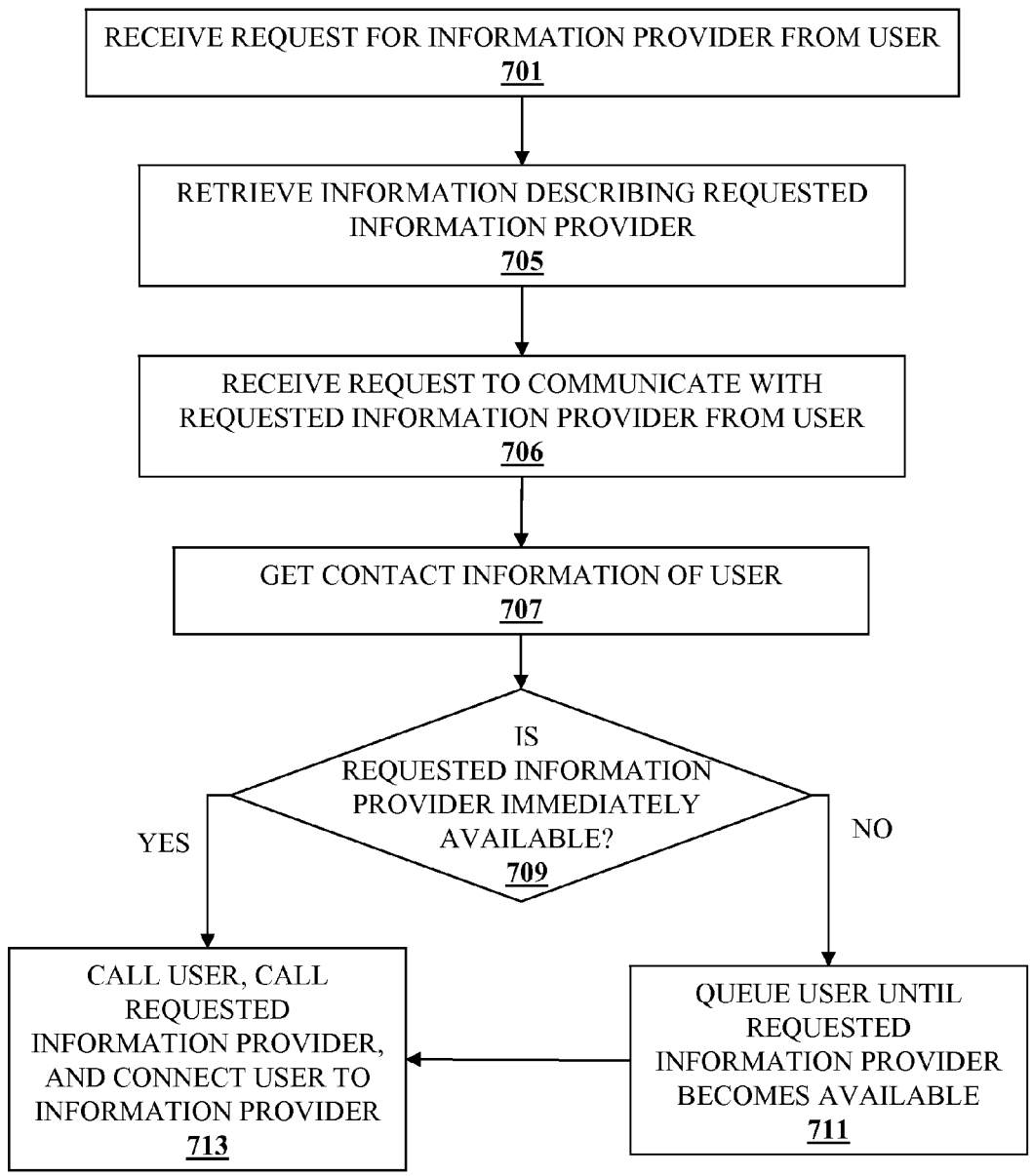
FIG. 7 is a flowchart for connecting a user to a requested information provider according to one embodiment of the invention.

FIG. 7 is a flowchart for connecting a user to a requested information provider according to one embodiment of the invention. At block 701, a request for an information provider is received from a user. At block 705, information describing the requested information provider is retrieved. At block 706, a request to communicate with the requested information provider is received from the user. At block 707, contact information is retrieved from the user. At block 709, it is determined if the requested information provider is immediately available. If the requested information provider is immediately available, then control flows to block 713. If the requested information provider is not immediately available, then control flows to block 711.

At block 713, the user is called, the requested information provider is called, and the user and requested information provider are entered into real-time communication, which may include a telephone connection, a voice connection over the internet, a live video connection, or an alternative form of communication.

At block 711, the user is queued until the requested information provider becomes available. From block 711, control flows to block 713.

Figure 8:
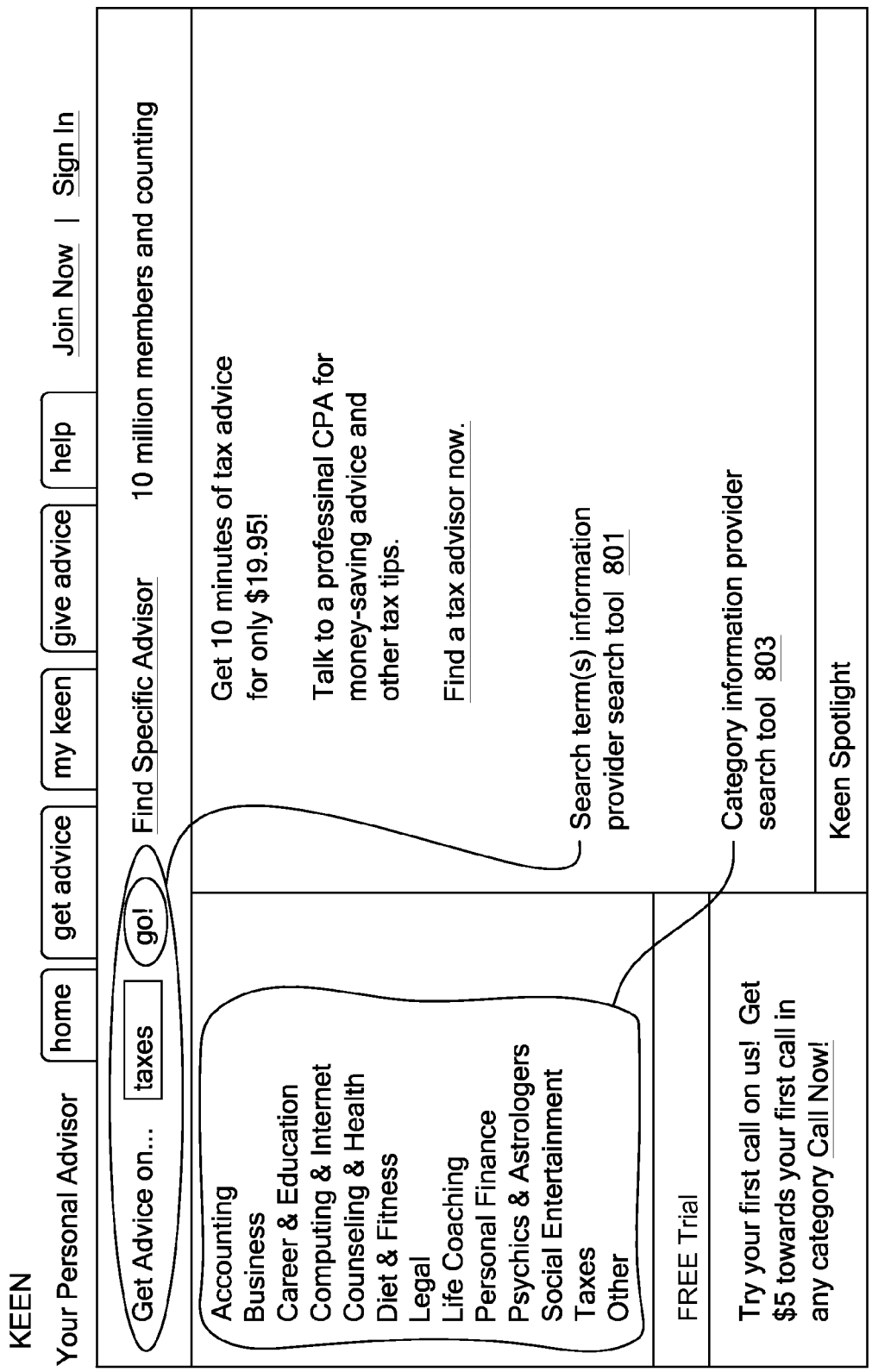
FIG. 8 is a screenshot of a web page for an information provider search engine according to one embodiment of the invention.

FIG. 8 is a screenshot of a web page or web site for an information provider search engine according to one embodiment of the invention. A screenshot of a web page illustrated in FIG. 8 includes a search term(s) information provider search tool 801. A user enters one or more search terms in a field and then clicks on the "go!" link. In addition to the search term(s) information provider search tool 801, the example web page includes a category information provider search tool 803. A user selects a category keyword which is either a link to additional keywords within the category, or brings the user to a web page that displays a prioritized list of information provider identifiers relevant to the selected category.

FIG. 9 is a screen shot of an exemplary web page displaying a prioritized list of information provider identifiers according to one embodiment of the invention. In FIG. 9, an information provider search term 911 is displayed at the top of the web page. In this example, the information provider search term 911 is "taxes." An information provider identifier 903 identifies a particular information provider. The information provider identifier 903 in the example illustrated in FIG. 9 is a link to a web page of information describing the identified information provider. A verification graphic 905 indicates whether a particular information provider has been verified by the information provider search engine and/or a third party verification entity. A rating 907 indicates a rating level for a particular information provider. In the example illustrated in FIG. 9, the rating 907 is a graphic of stars, although in alternative embodiments of the invention the rating may be a numerical value. An information provider's fee 913 indicates the per minute fee charged by the information provider to the user. A call link 909 is a link to a web page to collect information from a user in order to connect the user to a particular information provider.

Figure 10A:
FIGS. 10a-c illustrate example web interfaces for an information provider to review the fees paid by the competing information providers to an information provider search engine service for a priority listing according to one embodiment of the invention.

FIG. 10a is an example web interface for an information provider to review the fees paid by the competing information providers to an information provider search engine for priority listing according to one embodiment of the invention. FIG. 10a illustrates a web page that lists 5 information providers in the area of Psychics and Astrology. The web page shows the position, name, listing title, topic, and maximum bid, or fee, to be paid to the information provider search engine to obtain a higher position in the prioritized listing. The information provider in the first position has agreed to pay the information provider a priority fee of $7.25. The information provider in the second position has agreed to pay the information provider a priority fee of $7.20. The remaining three information providers have agreed to pay the information provider a priority fee of $7.00. The remaining three information providers are prioritized based on other priority variables since they have all agreed to pay the same priority fee.

Figure 10B:
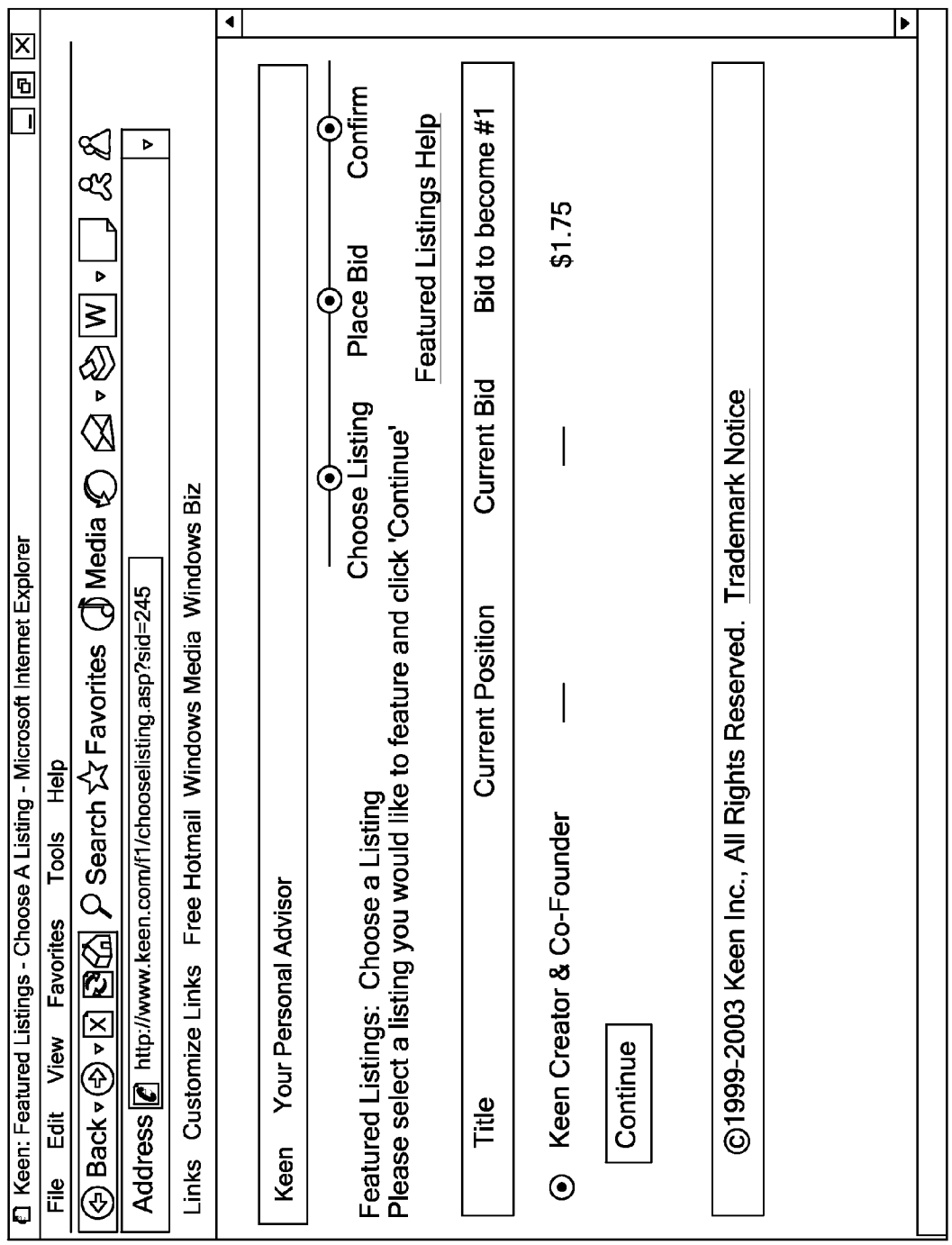
Figure 10C:
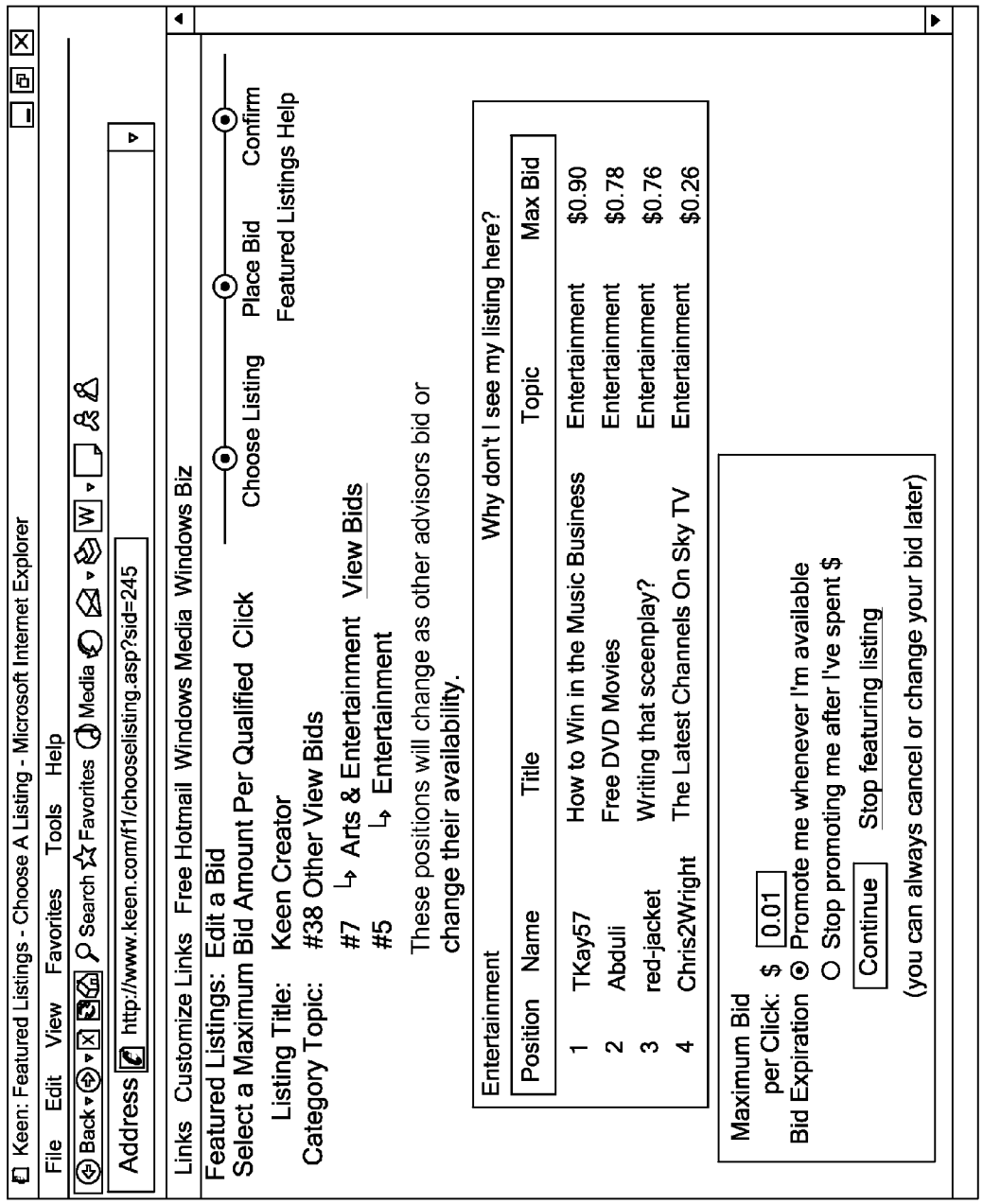

FIG. 10b is an example web interface for an information provider to select a listing or category for which they would like to bid to increase their respective priority position. In the example shown in FIG. 10b, the information provider has selected the listing "Keen Creator, and submitted a bid of $1.75 to become the #1 prioritized position. Furthermore, FIG. 10c is an example web interface requesting the information provider confirm their respective bid.

FIG. 11 is an exemplary report interface according to one embodiment of the invention. The web page illustrated in FIG. 11 displays a chart itemizing information for an information provider. The web page illustrated in FIG. 11 corresponds to a priority fee paid for clicks on an information provider listing. The report illustrated in FIG. 11 enables an information provider to see how his/her priority fees have performed. The information provider can see how many clicks he has paid for, how many calls these clicks resulted in, how much he earned from those calls, etc. This guides him to set his ideal maximum priority fee, the level at which he will break even. He then knows that all the paid clicks he pays for below this maximum priority fee will result in profit.

Illustrative Example

Danielle is a therapist in Chicago, who increasingly has been using the Internet to attract more clients to her business. In fact, she has been listing herself at an online services marketplace where she can attract clients and deliver services.

She creates a listing at this online services marketplace, describing her therapy services, indicating the schools where she received her psychology degree, and including a photo of herself. She indicates that her fee is $1 per minute or a bulk rate of $50 per hour for therapy services delivered through the online marketplace.

After Danielle has finished her morning reading, she is ready to take clients, so she goes to the online marketplace and indicates that she is available to receive calls. She does this by clicking on the "Available" button on the website or by calling a phone number, such as a toll free number, and pressing a button on her telephone keypad. When she has indicated that she is presently available, the website automatically indicates to all perusing clients that her business is currently ready for instant services. Customers who view her listing can see an availability indicator, such as a green telephone, next to her photo, indicating that this therapist is ready to receive a call at $1 per minute at this very moment.

One such customer named Kevin, one of her regulars, goes to her listing page, which he has bookmarked using his Internet browser. Kevin sees that Danielle is available at this very moment. Wishing to speak with her, he clicks on the green telephone next to her photo. The online services marketplace calls him, and his telephone rings. The online services marketplace then calls Danielle on her telephone. It then connects Kevin to Danielle for a live phone call that is billed to Kevin at $1 minute and paid to Danielle's online account.

Upon a trigger event (e.g., when Kevin is called, when Danielle is called, when Kevin and Danielle are connected, etc.) and while they are talking on the phone, Danielle's listing no longer displays a green telephone indicating that she is Available to receive calls. Since she is busy, the symbol turns red, indicating that she is currently busy with another customer.

When Danielle is finished with Kevin's call, she hangs up. The symbol next to her photo on the website automatically switches back to a green phone, indicating that she is once again ready to receive calls.

Danielle waits for an hour, but no one else calls her. She therefore decides to promote her online business in the advertising area of the online services marketplace.

The entry form in the advertising area asks her how much she is willing to pay for a qualified customer to view her online listing. She figures that, of every ten new customers who view her online listing, one of them will call her and become a regular customer. She figures a regular customer is worth about $100 for her. To be conservative, she starts with a low bid, indicating that she'll pay a maximum $2.00 for a qualified customer to view her online listing. If ten such customers click on and view her listing, she'll pay a total of $20.00, and one of those customers will become a regular, providing her with a healthy profit.

Her maximum bid of $2.00 per click ensures that, if a customer clicks on her listing and views it, she'll pay a maximum of $2.00. She may actually pay less than $2.00 per click, since that is her maximum bid. For example, the online marketplace will only charge her one penny more than the bidder below her, who is a therapist named Buck. Buck is bidding $1.90 per click. Since Buck is bidding $1.90, then Danielle will be charged $1.91 if someone clicks upon her listing.

Danielle submits her maximum bid of $2.00 per click. Before accepting her bid, the online marketplace checks to see whether her business has a satisfactorily high feedback rating associated with it. Danielle's average feedback rating is 4.5 stars, which is more than the 3-star minimum. Danielle also has a photograph on her listing, which is another minimum requirement of the advertising section. Since all of the minimum criteria are met, Danielle's bid is accepted by the system.

Danielle's bid of $2.00 per click is the second highest in the therapy section. She therefore appears in the second position on the page of therapists, one position above Buck at number three and one position below Cindy, who is bidding $2.20 and is therefore in the number-one position.

A customer named John browses the online marketplace every week, looking for counselors. He clicks on Danielle's listing. Danielle's account therefore is charged $1.91, which is one penny more than the $1.90 maximum bid of the therapist name Buck, who is below her in the number-three position. John, after reading Danielle's feedback at her listing, decides not to call her.

Michelle is another customer at the online marketplace. She sees Danielle's listing in the number-two spot and clicks on it. Danielle is again charged $1.91. Michelle, however, decides to call Danielle. She clicks on her green telephone, and their phone call begins. Danielle's listing automatically no longer displays a green telephone that indicates she is Available, since she is now busy.

A customer named Grant visits the online marketplace, looking for a therapist. He browses the advertisements of therapists. He sees Cindy in the number one position, but he doesn't see Danielle below her. He instead sees Buck in the number two position. Buck is bidding $1.90 per click, which is less than Danielle's $2.00, but since Danielle is currently on a call with Michelle, she is no longer available and so the online marketplace automatically removes her listing from the advertising section. This saves her a great deal of money. If the system hadn't automatically removed her, she would have been charged $1.91 when Grant clicked on her listing, even though Grant wouldn't have been able to call her at that moment.

Danielle finishes her phone call with Michelle. It was a ten-minute call, so she earned a total of ten dollars for this call. Since she hangs up the phone, she is once again available to receive new customers. Her listing automatically displays her green telephone of Availability again. Her listing also automatically reappears in the advertising section.

When Danielle decides to go to lunch, she changes her availability status either with a phone or with through a browser to make herself "Not Available. Her listing no longer displays a green telephone of Availability. It instead displays a message, such as the words "Away—please come again later. Her listing is also automatically removed from the number-two spot in the advertising section since she is no longer available, just like when she was busy with a call.

After lunch Danielle wants to see whether she's making a profit. She therefore visits the Reports section of the online marketplace. She sees that she was charged $1.91 due to a click from John. She was also charged $1.91 due to a click from Michelle. In total, she has been charged $3.82. However, she earned a total of $10.00 from her call with Michelle. Danielle therefore came out ahead $6.18 during the brief time she worked. The Reports section automatically calculates that Danielle could set her Maximum Bid higher than $2.00 per click and still be profitable. In fact, according to recent activity, Danielle's breakeven Maximum Bid would be $5.00. This bid would provide her with the maximum number of calls without her having to add outside money into the system. Danielle therefore raises her Maximum Bid to $5.00.

Danielle makes herself Available to receive calls once again. The green telephone appears on her listing. She reappears in the advertising section. This time she is in the number one spot, ahead of Cindy, who still has a Maximum Bid of $2.20.

Danielle's regular customer, Kevin, browses the advertising section. He sees Danielle's listing and clicks on it. However, since he is a regular customer of Danielle's, she is not charged for the click. The system automatically ignores his click because he is a regular customer, saving her money. Otherwise she would have been charged $2.21 for the click.

Another customer, Peter, clicks on Danielle's listing. She is charged $2.21 for the click. Maliciously, Peter clicks on Danielle's listing a total of twenty times, seeking to sabotage her business with multiple charges. However, the system only charges her for one click and ignores the other 19 clicks. In order to limit unfair charges, such as from malicious acts, the system automatically ignores multiple clicks from a single customer in each 24-hour period.

Alternative Embodiments

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.).

Thus, the method and apparatus of the invention can be practiced with modification and alteration within the spirit and scope of the appended claims. The description is thus to be regarded as illustrative instead of limiting on the invention.

What is claimed is:

1. A computer implemented method, comprising:
   receiving via a computer
     a priority bid of a first service provider and
     a service price of the first service provider;
   prioritizing via the computer a list of service providers to generate a prioritized list of the service providers, based at least on the priority bid of the first service provider;
   responsive to a selection of the first service provider, selected by a user from the prioritized list, determining via the computer whether the selection satisfies at least one of the criteria (1) the computer has provided a connection between the first service provider and the user within a predetermined period of time prior to the selection of the first service provider, (2) the user has made more than a predetermined number of selections of a service provider prior to the selection of the first service provider, and (3) the user has made more than a predetermined number of selections of the first service provider prior to the selection of the first service provider, and charging the first service provider according to the priority bid of the first service provider unless the selection satisfies at least one of the criteria; and responsive to the selection by the user, providing by the computer a connection between the first service provider and the user, and charging the user on behalf of the first service provider based on a duration of the connection and the service price of the first service provider.

2. The method of claim 1, wherein prioritizing is further based on at least one of: peer rating, independent auditor rating, user rating, relevancy, and experience.

3. The method of claim 1, wherein determining comprises determining whether the user has provided financial account information to the computer.

4. The method of claim 3, wherein the financial account information comprises information of a credit card account of the user.

5. The method of claim 4, further comprising determining whether the financial account information is received by the computer within a predetermined period of time from the selection of the first service provider.

6. The method of claim 1, wherein providing the connection comprises:
   retrieving via the computer contact information of the first service provider;
   making a first connection via the computer to the first information provider using the contact information and making a second connection to the user separately from the first connection; and
   connecting the first connection and the second connection.

7. The method of claim 1, further comprising:
   receiving via the computer a search request from the user;
   identifying via the computer the service providers according to the search request; and
   providing via the computer the prioritized list of the service providers to the user, as a response to the search request.

8. The method of claim 1, wherein the search request comprises a selection of a type of service providers.

9. The method of claim 1, further comprising:
   providing via the computer a user interface to the first service provider, the user interface allowing the first service provider to view and modify the priority bid and the service price.

10. The method of claim 1, wherein the connection between the first service provider and the user comprises a telephonic connection.

11. A storage medium storing instructions which, when read and executed by a computer, cause the computer to perform a method, the method comprising:
   receiving by the computer
      a priority bid of a first service provider and
      a service price of the first service provider;
   prioritizing by the computer a list of service providers to generate a prioritized list of the service providers, based at least on the priority bid of the first service provider;

responsive to a selection of the first service provider, selected by a user from the prioritized list, determining by the computer whether the selection satisfies at least one of the criteria (1) the computer has provided a connection between the first service provider and the user within a predetermined period of time prior to the selection of the first service provider, (2) the user has made more than a predetermined number of selections of a service provider prior to the selection of the first service provider, and (3) the user has made more than a predetermined number of selections of the first service provider prior to the selection of the first service provider, and charging the first service provider according to the priority bid of the first service provider unless the selection satisfies at least one of the criteria; and responsive to the selection by the user, providing by the computer a connection between the first service provider and the user, and charging the user on behalf of the first service provider based on a duration of the connection and the service price of the first service provider.

12. The medium of claim 11, wherein the method further comprises:
   receiving via the computer a search request from the user;
   identifying via the computer the service providers according to the search request; and
   providing via the computer the prioritized list of the service providers to the user, as a response to the search request.

13. The medium of claim 11, wherein the method further comprises:
   determining whether the user has provided financial account information to the computer.

14. The medium of claim 11, wherein the method further comprises:
   retrieving via the computer telephonic contact information of the first service provider;
   initiating via the computer a first telephonic connection to the first information provider using the telephonic contact information, the first telephonic connection being separate from a second telephonic connection between the computer and the user; and
   connecting the first connection and the second connection.

15. A computer-based system, comprising:
   a memory storing a database of service providers;
   at least one processor coupled with the memory configured to:
      prioritize a subset of the service providers to generate a prioritized list of service providers, based at least on a priority bid of a first service provider, and
      responsive to a selection of the first service provider, selected by a user from the prioritized list,
      determine whether the selection satisfies at least one of the criteria (1) the computer has provided a connection between the first service provider and the user within a predetermined period of time prior to the selection of the first service provider, (2) the user has made more than a predetermined number of selections of a service provider prior to the selection of the first service provider, and (3) the user has made more than a predetermined number of selections of the first service provider prior to the selection of the first service provider,
      charge the first service provider according to the priority bid of the first service provider unless the selection satisfies at least one of the criteria,
      provide a telephonic connection between the first service provider and the user, and charge the user on behalf of the first service provider based on a duration of the connection and a service price of the first service provider.

16. The system of claim 15, wherein the at least one processor is further configured to:
   identify the subset according to a search request; and
   retrieve telephonic contact information of the first service provider from the database in response to the selection;
   wherein the telephonic connection is established using the telephonic contact information retrieved from the database.

17. The system of claim 15, further comprising determining whether the user has provided financial account information to the computer.

* * * * *